(12) United States Patent
Deittert

(10) Patent No.: US 10,049,584 B2
(45) Date of Patent: Aug. 14, 2018

(54) PATH PLANNING

(71) Applicant: BAE Systems plc, London (GB)

(72) Inventor: Markus Deittert, South Gloucestershire (GB)

(73) Assignee: BAE Systems plc, London (GB)

( * ) Notice: Subject to any disclaimer, the term of this patent is extended or adjusted under 35 U.S.C. 154(b) by 71 days.

(21) Appl. No.: 15/121,549

(22) PCT Filed: Feb. 20, 2015

(86) PCT No.: PCT/GB2015/050497
§ 371 (c)(1),
(2) Date: Aug. 25, 2016

(87) PCT Pub. No.: WO2015/140496
PCT Pub. Date: Sep. 24, 2015

(65) Prior Publication Data
US 2016/0364988 A1    Dec. 15, 2016

(30) Foreign Application Priority Data

Mar. 18, 2014 (EP) ..................... 14275077
Mar. 18, 2014 (GB) ................... 1404787.2

(51) Int. Cl.
G01C 21/24 (2006.01)
G08G 5/00 (2006.01)
(Continued)

(52) U.S. Cl.
CPC .......... G08G 5/0034 (2013.01); G01C 21/00 (2013.01); G01C 21/20 (2013.01); G05D 1/0005 (2013.01); G06Q 10/047 (2013.01)

(58) Field of Classification Search
CPC ...... G01C 21/00; G01C 21/20; G06Q 10/047; G08G 5/0034; G05D 1/0005
See application file for complete search history.

(56) References Cited

U.S. PATENT DOCUMENTS 9,026,275 B1 *  5/2015  Young ................... G08G 5/003
                                                         701/11
9,620,021 B1 *  4/2017  Barber .................. G08G 5/003
                                (Continued)

FOREIGN PATENT DOCUMENTS

EP      1693649 A2    8/2006
EP      1835370 A2    9/2007
WO   2012098375 A1    7/2012

OTHER PUBLICATIONS

International Preliminary Report on Patenability of PCT Application PCT/GB2015/050497, dated Sep. 20, 2016, 9 pages.
(Continued)

*Primary Examiner* — Hussein Elchanti
(74) *Attorney, Agent, or Firm* — Maine Cernota & Rardin

(57) ABSTRACT

A profiling approach for determining a path for an aircraft, using a method comprising the steps of determining at least two waypoints between a starting position and a desired terminal position for the aircraft, determining a path for the aircraft between the starting position and the terminal position, by performing a linear approximation of the heights of the waypoints such that the average height change between waypoints is minimized, and constrained by a maximum climb angle of said aircraft, and performing a linear approximation of arrival times for each of the waypoints and aircraft speeds between the waypoints, constrained by permissible velocity of said aircraft on the slope between the waypoints. In this way, the non-linear relationship between climb rate and speed is approximated with linear equations, because determination of the path between each set of two waypoints is broken into two linear problems.

15 Claims, 7 Drawing Sheets

(51) Int. Cl.
*G01C 21/00* (2006.01)
*G06Q 10/04* (2012.01)
*G01C 21/20* (2006.01)
*G05D 1/00* (2006.01)

(56) References Cited

U.S. PATENT DOCUMENTS

| | | | |
|---|---|---|---|
| 2006/0184294 A1 | 8/2006 | Ma et al. | |
| 2009/0112454 A1 | 4/2009 | Wachenheim et al. | |
| 2010/0017113 A1 | 1/2010 | Artini | |
| 2010/0094485 A1 | 4/2010 | Verlut et al. | |
| 2010/0168939 A1* | 7/2010 | Doeppner | G05D 1/0676 701/16 |
| 2012/0253562 A1* | 10/2012 | Wachenheim | G08G 5/0034 701/4 |
| 2013/0325222 A1* | 12/2013 | Roh | B64C 39/024 701/18 |
| 2015/0120100 A1* | 4/2015 | Sacle | G01C 21/20 701/18 |
| 2015/0262490 A1* | 9/2015 | Deker | G08G 5/0052 701/3 |

OTHER PUBLICATIONS

Extended European Search Report dated Sep. 17, 2014 of Application EP14275077, 8 pages.
Search Report under Section 17(5) dated Sep. 17, 2014 of Application GB1404787.2, 3 pages.
International Search Report and Written Opinion dated May 22, 2015 of Application PCT/GB2015/050497, 13 pages.

* cited by examiner

| Variable | Value |
|---|---|
| $v_{max}$ | 30 m/s |
| $v_{min}$ | 10 m/s |
| $n_{max}$ | 4 g |
| $\dot{z}_{max}$ | 3.5 m/s |
| $\gamma_{max}$ | 1/5.3 |
| $a_{max}$ | 3 m/s$^2$ |
| $a_{min}$ | -1 m/s$^2$ |

PATH PLANNING

RELATED APPLICATIONS

This application is a national phase application filed under 35 USC § 371 of PCT Application No. PCT/GB2015/050497 with an International filing date of 20 Feb. 2015 which claims priority of GB Patent Application 1404787.2 filed 18 Mar. 2014 and EP Patent Application 14275077.7 filed 18 Mar. 2014. Each of these applications is herein incorporated by reference in their entirety for all purposes.

FIELD OF THE DISCLOSURE

This invention relates generally to path planning for vehicles and, more particularly, to path planning for airborne vehicles such as fixed wing aircraft, helicopters, and the like.

BACKGROUND

Path planning can be implemented as a two-step process:
1. find a collision-free, static path through the world; and
2. find a speed profile that is safe and takes vehicle limitations into account.

Path planning methodologies, for example using Mixed Integer Linear Programming (MILP), are known for determining globally optimal paths for vehicles between a starting position and a desired terminal position. For example, International Patent Application no. PCT/GB2012/050041 (Publication No. WO2012/098375) describes a trajectory planning system for vehicles, in which the trajectory is determined using a linear approximation of the dynamics of the vehicle, which linear approximation is constrained by requirements that acceleration of the vehicle during the trajectory is less than a threshold value for the acceleration, and the threshold value is dependent on an infinity norm of the velocity of a vehicle. These constraints aim to take into account a notion of vehicle heading, which ensures that the determined trajectory does not feature motion that cannot be achieved by conventional wheeled or tracked vehicles.

The use of linear approximation in path planning methodologies is advantageous in that it simplifies and enables rapid path planning, whilst minimising processing power required and also ensuring that the methodology can be relatively easily integrated into larger systems. However, this and other path planning methodologies, facilitate profiling over a path for a ground vehicle, but tend not to be ideal for path planning in respect of airborne vehicles because they do not take into account additional constraints in relation to height and factors affecting climb performance. These factors require the determination of speed and height profiles, which makes the problem non-linear and, therefore, much more complex.

In more detail, and referring to FIGS. 6(a) to (c) of the drawings, for a given route of 2D waypoints, arrival time, speed and height values must be found in order to perform path planning. However, as shown in the Figures, each waypoint has a position with bounds on its height and bounds on the arrival time such that acceleration, velocity and climb rate constraints are satisfied; and optimisation of this problem is strongly non-linear with its key variables being coupled by non-linear equations.

The present invention seeks to address at least some of these issues and provide a method and system for rapid path profiling and, therefore, simplified path planning in respect of airborne vehicles.

SUMMARY

In accordance with the present invention, there is provided a method for determining a path for an aircraft, comprising the steps of:
  determining at least two waypoints between a starting position and a desired terminal position for the aircraft;
  determining a path for the aircraft by:
    (i) performing a linear approximation of the heights of said at least two waypoints such that the average height change between waypoints is minimised, and constrained by a maximum climb angle of said aircraft; and
    (ii) performing a linear approximation of arrival times for each of said two waypoints and aircraft speeds between said at least two waypoints, constrained by permissible velocity of said aircraft on the slope between said at least two waypoints.

Also in accordance with the present invention, there is provided apparatus for determining a path for an aircraft, the apparatus comprising one or more processors arranged to determine a path for the aircraft between a starting position and a desired terminal position, wherein at least two waypoints are defined therebetween, by:
  (i) performing a linear approximation of the heights of said at least two waypoints such that the average height change between waypoints is minimised, and constrained by a maximum climb angle of said aircraft; and
  (ii) performing a linear approximation of arrival times for each of said at least two waypoints and aircraft speeds between said at least two waypoints, constrained by permissible velocity of said aircraft on the slope between said at least two waypoints.

Thus, the non-linear relationship between climb rate and speed can be approximated with linear equations, because determination of the path between each set of two waypoints is broken into two linear problems, such that the resulting path is dynamically feasible.

For the avoidance of doubt, a waypoint referred to herein is a reference point in physical space, for example denoted by a 2D coordinate, used for the purposes of navigation. It will be appreciated that several different methods of obtaining 2D waypoints and associated height limits are known in the art, and any known planning method can be used for this purpose. The present invention is not intended to be in any way limited in this regard.

The height of each of said at least two waypoints may be bounded by a predetermined maximum and/or minimum value, and an absolute value of the slope of the path may be bounded by a predetermined maximum value.

The slope of the or each path segment between adjacent waypoints may be bounded by a predetermined maximum value, and aircraft speed may be bounded by a predetermined maximum and/or minimum value.

Indeed, the aircraft speed at each waypoint may be bounded by a predetermined maximum value, and it may also be bounded by permissible aircraft speed or speed range for an immediately preceding or succeeding path segment.

The average aircraft speed on the or each path segment between two adjacent waypoints may calculated using the aircraft speeds at the first and/or final waypoints on the path.

The linear approximation of the heights of said at least two waypoints may be implemented using the following:

$$\min_{z, dz, dz_{abs}} f = \frac{1}{n-1} \Sigma_i^{n-1} dz_{abs_i} \qquad (1)$$

Subject to:

$$z_0 = z_1 \quad (2)$$

$$\forall i \in [1 \ldots n]: z_i \leq z_{max_i} \quad (3)$$

$$\forall i \in [1 \ldots n]: z_i \geq z_{min_i} \quad (4)$$

$$\forall i \in [2 \ldots n]: dz_{i-1} = z_i - z_{i-1} \quad (5)$$

$$\forall i \in [2 \ldots n]: dz_{i-1} / d_{i-1} \leq \gamma_{i-1} \quad (6)$$

$$\forall i \in [2 \ldots n]: \frac{dz_{i-1}}{d_{i-1}} \geq -\gamma_{i-1} \quad (7)$$

$$\forall i \in [2 \ldots n]: dz_{i-1} \leq dz_{abs_i} \quad (8)$$

$$\forall i \in [2 \ldots n]: dz_{i-1} \geq -dz_{abs_i} \quad (9)$$

where n is the number of waypoints on the path, $z_{min_i}$ and $z_{max_i}$ denote minimum and maximum height values respectively, i denotes each path segment between adjacent waypoints, $dz_i$ is the height difference along the $i^{th}$ path segment, $d_i$ denotes the length of the $i^{th}$ path segment, $dz_{abs_i}$ is an absolute value of the height difference on the $i^{th}$ path segment, and γ denotes an absolute slope limit of the path.

Further, the linear approximation of arrival times for each of said at least two waypoints and aircraft speeds between said at least two waypoints may be implemented by the following:

$$\min_{v, \bar{v}, \bar{v}_{inv}, t} f = t_n \quad (10)$$

Subject to:

$$v_1 = v_0 \quad (11)$$

$$t_1 = t_0 \quad (12)$$

$$\forall i \in [1 \ldots n]: t_i \leq t_{max_i} \quad (13)$$

$$\forall i \in [1 \ldots n]: t_i \geq t_{min_i} \quad (14)$$

$$\forall i \in [1 \ldots n]: v_i \leq v_{max} \quad (15)$$

$$\forall i \in [1 \ldots n]: v_i \geq v_{min} \quad (16)$$

$$\forall i \in [1 \ldots n]: v_i \leq v_{lim_i} \quad (17)$$

$$\forall i \in [2 \ldots n]: v_{i-1} \geq \hat{v}_{min_i} \quad (18)$$

$$\forall i \in [2 \ldots n]: v_i \geq \hat{v}_{min_i} \quad (19)$$

$$\forall i \in [2 \ldots n]: v_{i-1} \leq \hat{v}_{max_i} \quad (20)$$

$$\forall i \in [2 \ldots n]: v_i \leq \hat{v}_{max_i} \quad (21)$$

$$\forall i \in [2 \ldots n]: \bar{v}_{i-1} = \tfrac{1}{2}(v_i + v_{i-1}) \quad (22)$$

$$\forall i \in [2 \ldots n]: \bar{v}_{inv_i} d_{i,i-1} \leq t_i - t_{i-1} \quad (23)$$

$$\forall i \in [1 \ldots n] \forall k \in [1 \ldots n_a]: \bar{v}_i \geq m_k \bar{v}_{inv_i} + c_k \quad (24)$$

$$\forall i \in [2 \ldots n]: v_i \leq v_{i-1} + a_{max}(t_i - t_{i-1}) \quad (25)$$

$$\forall i \in [2 \ldots n]: v_i \geq v_{i-1} + a_{min}(t_i - t_{i-1}) \quad (26)$$

where $t_{max_i}$ and $t_{min_i}$ denote the permissible arrival time band at the $i^{th}$ waypoint. $v_{max}$ and $v_{min}$ denote the maximum and minimum speed of the vehicle. The maximum and minimum speeds on the $i^{th}$ segment (due to its slope and height) are denoted by and $\hat{v}_{max_i}$ and $\hat{v}_{min_i}$. $v_{lim_i}$ denotes the velocity limit at the $i^{th}$ waypoint, due to the path's curvature at that waypoint. The variable $v_i$ models the vehicle's speed at the $i^{th}$ waypoint. The variable $\bar{v}_i$ models the vehicles average speed on the $i^{th}$ segment. The constants $m_k$ and $c_k$ denote the slope and the y-axis intercept of the $k^{th}$ linear approximation of the relationship between $\bar{v}_i$ and $\bar{v}_{inv_i}$ (see FIG. 2). The vehicle's acceleration limit and deceleration limit are denoted by $a_{max}$ and $a_{min}$ respectively.

In an alternative exemplary embodiment of the invention, in which ambient wind is taken into account, the linear approximation of arrival times for each of said at least two waypoints and aircraft speeds between said at least two waypoints may be implemented by the following.

$$\min_{v_{air}, v_{gnd}, \bar{v}_{gnd}, \bar{v}_{inv}, t} f = t_n \quad (27)$$

Subject to:

$$v_1 = v_0 \quad (28)$$

$$t_1 = t_0 \quad (29)$$

$$\forall i \in [1 \ldots n]: v_{air_i} = v_{gnd_i} c_i - v_{w_i} \quad (30)$$

$$\forall i \in [1 \ldots n]: t_i \leq t_{max_i} \quad (31)$$

$$\forall i \in [1 \ldots n]: t_i \geq t_{min_i} \quad (32)$$

$$\forall i \in [1 \ldots n]: v_{air_i} \leq v_{max} \quad (33)$$

$$\forall i \in [1 \ldots n]: v_{air_i} \geq v_{min} \quad (34)$$

$$\forall i \in [1 \ldots n]: v_{air_i} \leq v_{lim_i} \quad (35)$$

$$\forall i \in [2 \ldots n]: v_{air_{i-1}} \geq \hat{v}_{min_i} \quad (36)$$

$$\forall i \in [2 \ldots n]: v_{air_i} \geq \hat{v}_{min_i} \quad (37)$$

$$\forall i \in [2 \ldots n]: v_{air_{i-1}} \leq \hat{v}_{max_i} \quad (38)$$

$$\forall i \in [2 \ldots n]: v_{air_i} \leq \hat{v}_{max_i} \quad (39)$$

$$\forall i \in [2 \ldots n]: \bar{v}_{gnd_{i-1}} = \tfrac{1}{2}(v_{gnd_i} + v_{gnd_{i-1}}) \quad (40)$$

$$\forall i \in [2 \ldots n]: \bar{v}_{inv_{i-1}} d_{i,i-1} \leq t_i - t_{i-1} \quad (41)$$

$$\forall i \in [1 \ldots n] \forall k \in [1 \ldots n_a]: \bar{v}_{gnd_i} \geq m_k \bar{v}_{inv_i} + c_k \quad (42)$$

$$\forall i \in [2 \ldots n]: v_i \leq v_{air_{i-1}} + a_{max}(t_i - t_{i-1}) \quad (43)$$

$$\forall i \in [2 \ldots n]: v_i \geq v_{air_{i-1}} + a_{min}(t_i - t_{i-1}) \quad (44)$$

where $t_{max_i}$ and $t_{min_i}$ denote the permissible arrival time band at the $i^{th}$ waypoint. $v_{max}$ and $v_{min}$ denote the maximum and minimum speed of the vehicle. The maximum and minimum speeds on the $i^{th}$ segment (due to its slope and height) are denoted by $\hat{v}_{max_i}$ and $\hat{v}_{min_i}$. $v_{lim_i}$ denotes the velocity limit at the $i^{th}$ waypoint, due to the path's curvature at that waypoint. The variable $v_i$ models the vehicle's speed at the $i^{th}$ waypoint. The variable $\bar{v}_i$ models the vehicles average speed on the $i^{th}$ segment. The constants $m_k$ and $c_k$ denote the slope and the y-axis intercept of the $k^{th}$ linear approximation of the relationship between $\bar{v}_i$ and $\bar{v}_{inv_i}$ (see FIG. 2). The vehicle's acceleration limit and deceleration limit are denoted by $a_{max}$ and $a_{min}$ respectively.

The present invention extends to a program or plurality of programs arranged such that, when executed by a computer system or one or more processors, it/they cause the computer system or the one or more processors to operate in accordance with the method defined above. The present invention also extends to a machine readable storage medium storing such a program or at least one of such programs.

BRIEF DESCRIPTION OF THE DRAWINGS

Embodiments of the present invention will now be described by way of examples only and with reference to the accompanying drawings, in which.

DETAILED DESCRIPTION

Figure 1A:
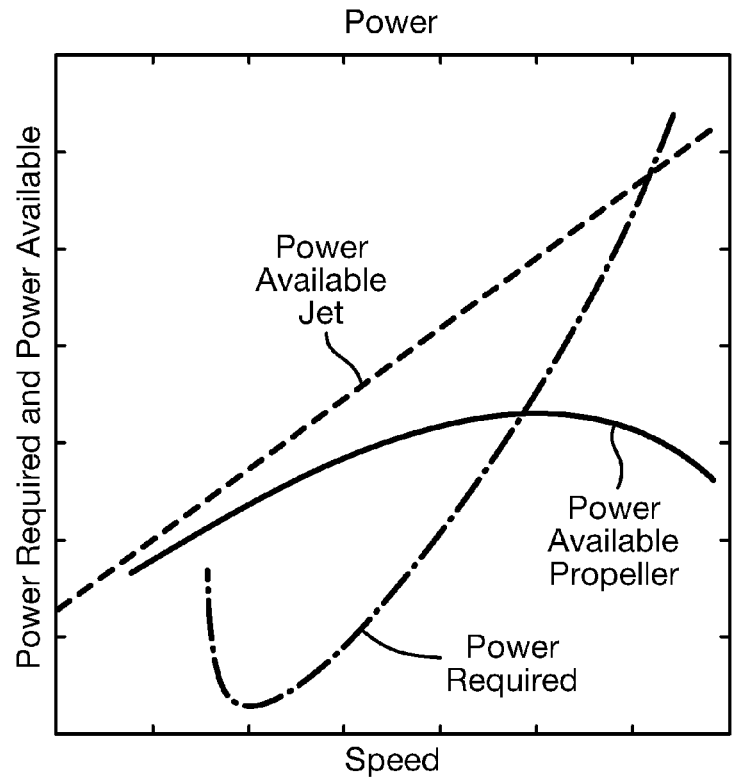
FIG. 1(a) is an exemplary fixed wing aircraft performance diagram.
Figure 1B:
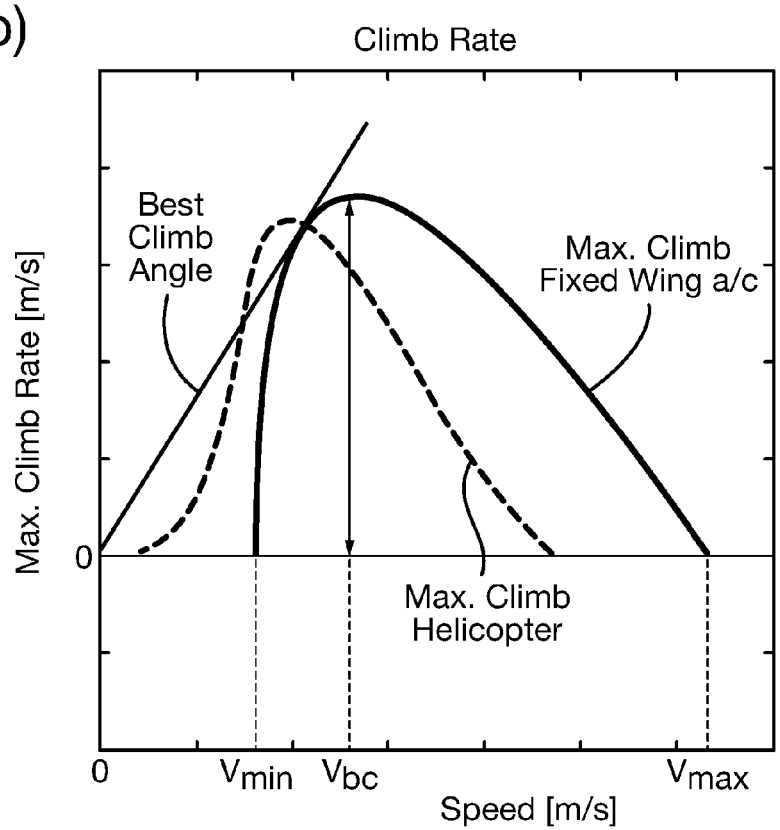
FIG. 1(b) is an exemplary climb rate limit diagram for a fixed wing aircraft and for a helicopter, wherein the velocities illustrated relate to the fixed wing aircraft case.

The present invention provides a method and system for determining a path for an aircraft. The aircraft that will follow the resulting path has a limited and speed-dependent climb rate, upper and lower bounds on its velocity, as well as limited acceleration and deceleration. The climb performance of an aircraft is affected by certain variables. The vertical velocity, or climb rate, of an aircraft depends on the flight speed and the inclination of the flight path. In fact, the rate of climb is the vertical component of the flightpath velocity. Thus, the conditions of the aircraft's maximum climb angle or maximum climb rate occur at specific speeds, and variations in speed will produce variations in climb performance. For rate of climb, the maximum rate would occur where there exists the greatest difference between power available and power required, as shown in FIG. 1(a) of the drawings. FIG. 1(b) shows the resulting non-linear relationship between an aircraft's speed and upper climb rate limit, due to the non-linear relationship between the power available and power required at various speeds.

Once a good 2D path has been found using any known planning method, as discussed above, and considering the selected waypoints between a starting position and a desired terminal position for the path, these are bound firstly by the starting and terminal positions themselves and any obstacles that may lie between them. However, the height between adjacent waypoints are necessarily also bound by the climb rate capability of the aircraft required to follow the path. Therefore, waypoint arrival times, climb rate limits and speed limits due to curvature all depend on the aircraft's speed, acceleration limit and climb performance. Thus, the problem's key difficulty is its non-linear nature, and the method and system described herein decomposes the problem into several sequential linear problems, which can be solved using linear programming techniques, such as Linear Programming (LP) and Mixed Integer Linear Programming (MILP). These techniques allow reduced computational effort and rapid path planning using high speed modules.

The following approach uses a two-step method, whereby the first step determines optimal waypoint heights and the second step computes the required velocity profile.

Let the desired path, P, be modelled as an ordered sequence of n 2D waypoints, i.e. $P=[P_1, P_2, \ldots, P_n]$ Each point, $P_i$, consists of a location $[x_i, y_i]$, bounds on permissible height values, $[z_{min_i}, z_{max_i}]$ and nominal arrival time $[t_{min_i}, t_{max_i}]$. Let $z_0$, $t_0$ and $v_0$ denote the initial height, initial time and initial speed respectively. $v_i$, $t_i$ and $z_i$ are variables of the optimisation and denote the aircraft's speed its arrival time and height at the $i^{th}$ waypoint.

The first pass will determine waypoint heights, such that these heights fall into waypoint height bounds and the average height change is minimised. In addition, the height changes are limited, such that the aircraft's minimum climb angle is not violated. A path with shallow climb slopes allows for maximum variation of speed along the path. The optimisation problem may be posed as follows:

$$\min_{z, dz, dz_{abs}} f = \frac{1}{n-1} \Sigma_i^{n-1} dz_{abs_i} \quad (1)$$

subject to:

$$z_0 = z_1 \quad (2)$$

$$\forall i \in [1 \ldots n]: z_i \leq z_{max_i} \quad (3)$$

$$\forall i \in [1 \ldots n]: z_i \geq z_{min_i} \quad (4)$$

$$\forall i \in [2 \ldots n]: dz_{i-1} = z_i - z_{i-1} \quad (5)$$

$$\forall i \in [2 \ldots n]: dz_{i-1}/d_{i-1} \leq \gamma_{i-1} \quad (6)$$

$$\forall i \in [2 \ldots n]: \frac{dz_{i-1}}{d_{i-1}} \geq -\gamma_{i-1} \quad (7)$$

$$\forall i \in [2 \ldots n]: dz_{i-1} \leq dz_{abs_i} \quad (8)$$

$$\forall i \in [2 \ldots n]: dz_{i-1} \geq -dz_{abs_i} \quad (9)$$

where n is the number of waypoints on the path, $z_{min_i}$ and $z_{max_i}$ denote minimum and maximum height values respectively, i denotes each path segment between adjacent waypoints, $dz_i$ is the height difference along the $i^{th}$ path segment, $d_i$ denotes the length of the $i^{th}$ path segment, $dz_{abs_i}$ is an absolute value of the height difference on the r path segment, and $\gamma$ denotes an absolute slope limit of the path.

The cost function of equation (1) minimises the mean climb along the path. Equations (3) and (4) limit the permissible height value of each waypoint. Equation (2) sets the initial conditions at the start of the path, Equation (5) links the absolute waypoint heights to the height change on each path segment. For each path segment, Equations (6) and (7) limit the absolute value of the path's slope to be less than $\gamma$. Equations (8) and (9) link the actual value of a segment's slope to its absolute value.

Figure 3:
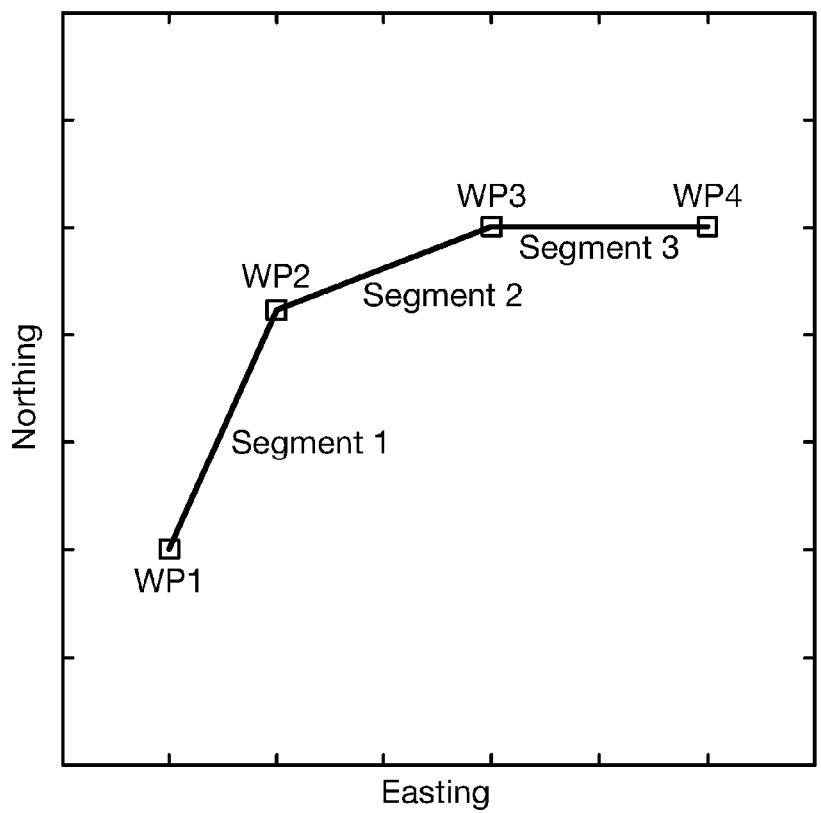
FIG. 3 illustrates an exemplary path comprising four waypoints and three path/route segments.

Once the waypoint heights have been determined, the second pass will compute optimal waypoint arrival times and speeds on each segment (where a segment is defined as the path between two adjacent waypoints). Referring to FIG. 3 of the drawings, there is illustrated an exemplary path with four waypoints (WP) and three path/route segments. The slope of each path segment is known from the results of the first pass. Inspection of FIG. 1(b) shows that for any slope less than the maximum slope, an upper and lower velocity limit exists. Thus, the velocities at each waypoint are constrained by the permissible velocities on each slope. It is assumed that the aircraft smoothly changes in velocity between two waypoints, and the optimisation problem is posed as follows:

$$\min_{v,\bar{v},\bar{v}_{inv},t} f = t_n \quad (10)$$

Subject to:

$$v_1 = v_0 \quad (11)$$

$$t_1 = t_0 \quad (12)$$

$$\forall i \in [1 \ldots n]: t_i \leq t_{max_i} \quad (13)$$

$$\forall i \in [1 \ldots n]: t_i \geq t_{min_i} \quad (14)$$

$$\forall i \in [1 \ldots n]: v_i \leq v_{max} \quad (15)$$

$$\forall i \in [1 \ldots n]: v_i \geq v_{min} \quad (16)$$

$$\forall i \in [1 \ldots n]: v_i \leq v_{lim_i} \quad (17)$$

$$\forall i \in [2 \ldots n]: v_{i-1} \geq \hat{v}_{min_i} \quad (18)$$

$$\forall i \in [2 \ldots n]: v_i \geq \hat{v}_{min_i} \quad (19)$$

$$\forall i \in [2 \ldots n]: v_{i-1} \leq \hat{v}_{max_i} \quad (20)$$

$$\forall i \in [2 \ldots n]: v_i \leq \hat{v}_{max_i} \quad (21)$$

$$\forall i \in [2 \ldots n]: \bar{v}_{i-1} = \tfrac{1}{2}(v_i + v_{i-1}) \quad (22)$$

$$\forall i \in [2 \ldots n]: \bar{v}_{inv_i} d_{i,i-1} \leq t_i - t_{i-1} \quad (23)$$

$$\forall i \in [1 \ldots n] \forall k \in [1 \ldots n_a]: \bar{v}_i \geq m_k \bar{v}_{inv_i} + c_k \quad (24)$$

$$\forall i \in [2 \ldots n]: v_i \leq v_{i-1} + a_{max}(t_i - t_{i-1}) \quad (25)$$

$$\forall i \in [2 \ldots n]: v_i \geq v_{i-1} + a_{min}(t_i - t_{i-1}) \quad (26)$$

where n is the number of waypoints on said path, i denotes each waypoint, $v_i$, $t_i$ and $z_i$ denote the aircraft's speed, arrival time and height respectively at the $i^{th}$ waypoint, $t_{min_i}$ and $t_{max_i}$ denote a permissible arrival time at the $i^{th}$ waypoint, $v_{max}$ and $v_{min}$ denote maximum and minimum speeds respectively of the aircraft, $\hat{v}_{max_i}$ and $\hat{v}_{min_i}$ denote maximum and minimum speeds respectively on the $i^{th}$ path segment between respective waypoints, $v_{lim_i}$ denotes a velocity limit at the $i^{th}$ waypoint, $v_i$ models the aircraft's speed at the $i^{th}$ waypoint, $\bar{v}_i$ models the aircraft's average speed at the $i^{th}$ path segment, $\bar{v}_{inv_i}$ is the inverse of $v_i$, constants $m_k$ and $c_k$ denote the slope and y-axis intercept of the $k^{th}$ linear approximation of the relationship between $\bar{v}_i$ and $\bar{v}_{inv_i}$, and the aircraft's acceleration limit and deceleration limit are denoted by $a_{max}$ and $a_{min}$ respectively.

Figure 2:
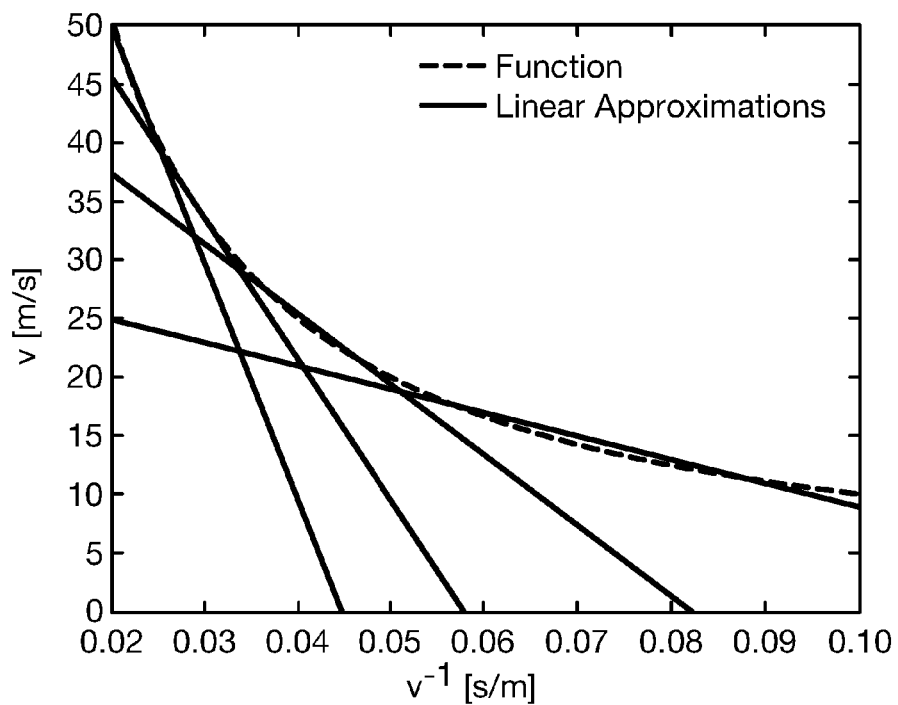
FIG. 2 is a graphical representation representing a linear approximation between the speed on a segment and its inverse.

Equations (11) and (12) set the initial conditions at the first waypoint, i.e. the vehicle's current position. Equations (15) and (16) enforce general limits on vehicle speed, while equation (17) enforces an upper speed limit at each waypoint, based on the path's curvature at the waypoint. Equations (18) to (21) enforce limits on the speeds at a given waypoint based on the permissible speed range for the waypoint's preceding and succeeding segments. The average speed on a segment, $\bar{v}_{i-1}$, is based on the speeds at is first and final waypoint, $v_{i-1}$ and $v_i$. The relation is enforced by equation (22). Equation (23) relates a segment's average speed to the segment's transition time span. Finally, equation (24) enforces the relation between the average speed on a segment, $\bar{v}_i$ and its inverse $\bar{v}_{inv_i}$. As shown in FIG. 2, the inverse is approximated with a finite number of linear equations.

In order to simplify the above problems, it is assumed that the angle of climb is shallow, such that the aircraft's speed $v_{air}$ is approximately equal to its ground speed $v_{gnd}$, i.e. $v_{air} \approx v_{gnd}$. In addition, the absence of any wind is assumed.

Thus, if ambient wind is taken into account, the optimisation problem may be posed as follows:

$$\min_{v_{air}, v_{gnd}, \bar{v}_{gnd}, \bar{v}_{inv}, t} f = t_n \quad (27)$$

Subject to:

$$v_1 = v_0 \quad (28)$$

$$t_1 = t_0 \quad (29)$$

$$\forall i \in [1 \ldots n]: v_{air_i} = v_{gnd_i} c_i - v_{w_i} \quad (30)$$

$$\forall i \in [1 \ldots n]: t_i \leq t_{max_i} \quad (31)$$

$$\forall i \in [1 \ldots n]: t_i \geq t_{min_i} \quad (32)$$

$$\forall i \in [1 \ldots n]: v_{air_i} \leq v_{max} \quad (33)$$

$$\forall i \in [1 \ldots n]: v_{air_i} \geq v_{min} \quad (34)$$

$$\forall i \in [1 \ldots n]: v_{air_i} \leq v_{lim_i} \quad (35)$$

$$\forall i \in [2 \ldots n]: v_{air_{i-1}} \geq \hat{v}_{min_i} \quad (36)$$

$$\forall i \in [2 \ldots n]: v_{air_i} \geq \hat{v}_{min_i} \quad (37)$$

$$\forall i \in [2 \ldots n]: v_{air_{i-1}} \leq \hat{v}_{max_i} \quad (38)$$

$$\forall i \in [2 \ldots n]: v_{air_i} \leq \hat{v}_{max_i} \quad (39)$$

$$\forall i \in [2 \ldots n]: \bar{v}_{gnd_{i-1}} = \tfrac{1}{2}(v_{gnd_i} + v_{gnd_{i-1}}) \quad (40)$$

$$\forall i \in [2 \ldots n]: \bar{v}_{inv_{i-1}} d_{i,i-1} \leq t_i - t_{i-1} \quad (41)$$

$$\forall i \in [1 \ldots n] \forall k \in [1 \ldots n_a]: \bar{v}_{gnd_i} \geq m_k \bar{v}_{inv_i} + c_k \quad (42)$$

$$\forall i \in [2 \ldots n]: v_i \leq v_{air_{i-1}} + a_{max}(t_i - t_{i-1}) \quad (43)$$

$$\forall i \in [2 \ldots n]: v_i \geq v_{air_{i-1}} + a_{min}(t_i - t_{i-1}) \quad (44)$$

where $t_{max_i}$ and $t_{min_i}$ denote the permissible arrival time band at the $i^{th}$ waypoint. $v_{max}$ and $v_{min}$ denote the maximum and minimum speed of the vehicle. The maximum and minimum speeds on the $i^{th}$ segment (due to its slope and height) are denoted by $\hat{v}_{max_i}$ and $\hat{v}_{min_i}$. $v_{lim_i}$ denotes the velocity limit at the $i^{th}$ waypoint, due to the path's curvature at that waypoint. The variable $v_i$ models the vehicle's speed at the $i^{th}$ waypoint. The variable $\bar{v}_i$ models the vehicles average speed on the $i^{th}$ segment. The constants $m_k$ and $c_k$ denote the slope and the y-axis intercept of the $k^{th}$ linear approximation of the relationship between $\bar{v}_i$ and $\bar{v}_{inv_i}$ (see FIG. 2). The vehicle's acceleration limit and deceleration limit are denoted by $a_{max}$, and $a_{min}$ respectively.

Equation (30) relates the aircraft's air speed $v_{air_i}$ to its ground speed $v_{gnd_i}$, and the ambient wind, $v_{w_i}$. The correction factor, $c_i$ depends on the climb angle on the $i^{th}$ path segment (see FIG. 4a), with $$c = \frac{1}{\cos\alpha\gamma}.$$

Equations (28) and (29) set the initial conditions at the first waypoint, i.e. the vehicle's current position. Equations (33) and (34) enforce general limits on vehicle speed, while equation (35) enforces an upper speed limit at each waypoint, based on the path's curvature at the waypoint. Equations (36) to (39) enforce limits on the speeds at a given waypoint based on the permissible speed range for the waypoint's preceding and succeeding segments. The average ground speed on a segment is based on the speeds at its first and final waypoint. This relation is enforced by equation (40). Equation (41) relates a segment's average speed to the segment's transition time span. Finally, equation (42) enforces the relation between the average speed on a segment and its inverse.

Changes in velocity between waypoints are related to the vehicle acceleration and deceleration limits by equations (25) and (26) and equations (43) and (44).

Without loss of generality, it will be appreciated that it is assumed herein that the ambient wind flows only horizontally. In addition, it is also assumed herein that the aircraft's climb angle, γ, falls in the range $$-\frac{\pi}{4} \leq \gamma \leq \frac{\pi}{4}.$$

The cost function in Equations (10) and (27) minimise the arrival time at the last waypoint. However, it will be appreciated by a person skilled in the art that the proposed methodology is open to other cost functions, for example:

$$\min f = \sum_i |v_{air_i} - v_{nom}| \quad (45)$$

which minimises departures from the aircraft's optimal cruising velocity.

Figures 4, 4A:
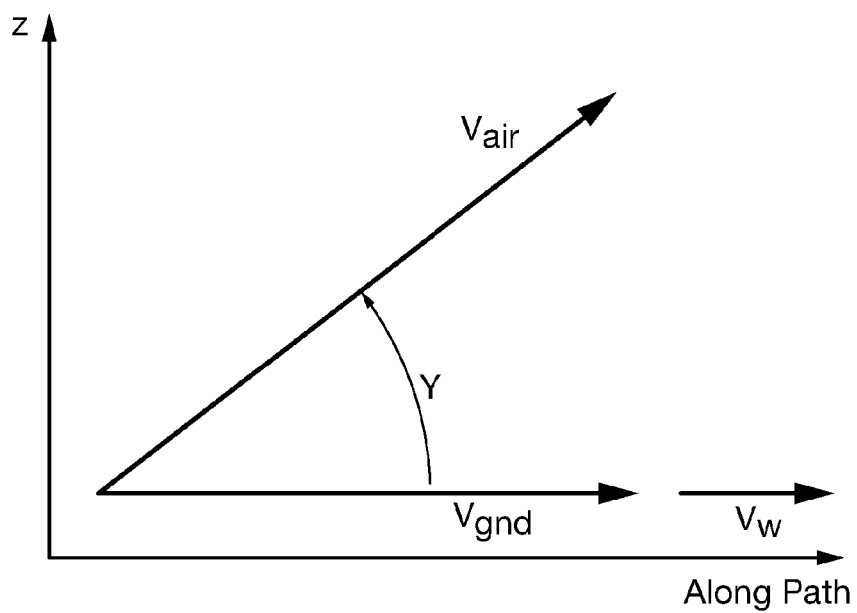
FIG. 4 is a table illustrating exemplary aircraft performance data.
FIG. 4a is a graphical representation of the relationship between air speed, $v_{air}$, fround speed, $v_{gnd}$, climb angle, $\gamma$, and wind speed $v_w$.

FIG. 5 illustrates the output of a profiling approach according to an exemplary embodiment of the present invention, where the table of FIG. 4 provides performance data for the aircraft used in the approach.

Figure 5A:
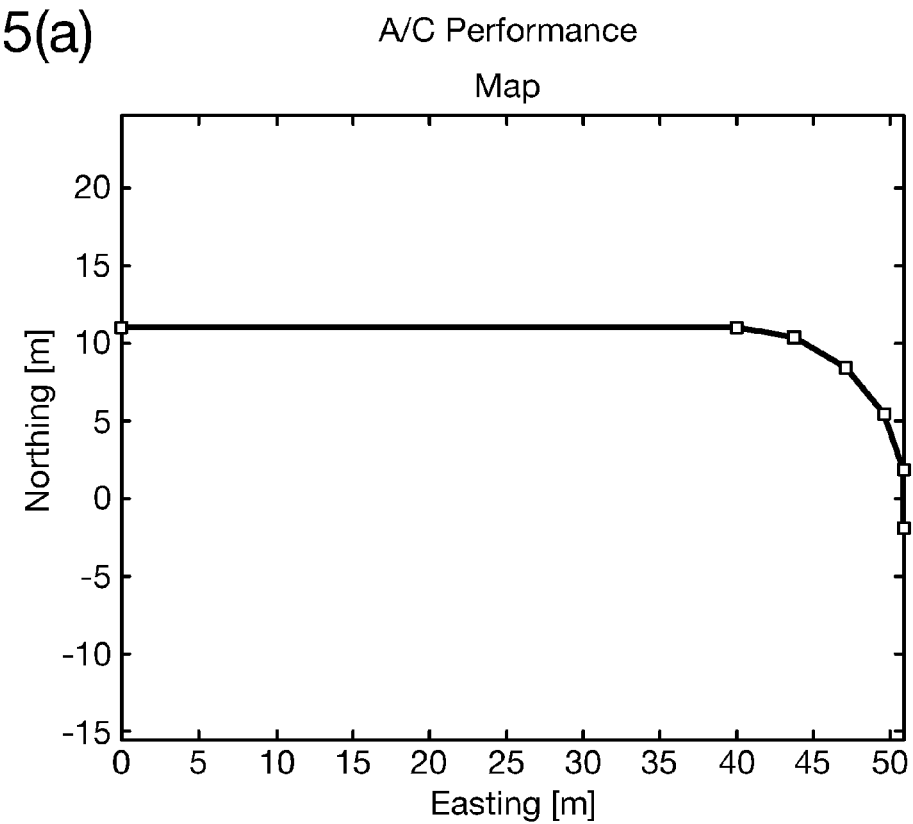
FIGS. 5(a) to (f) illustrate the output of an exemplary method according to the invention.
Figure 5B:
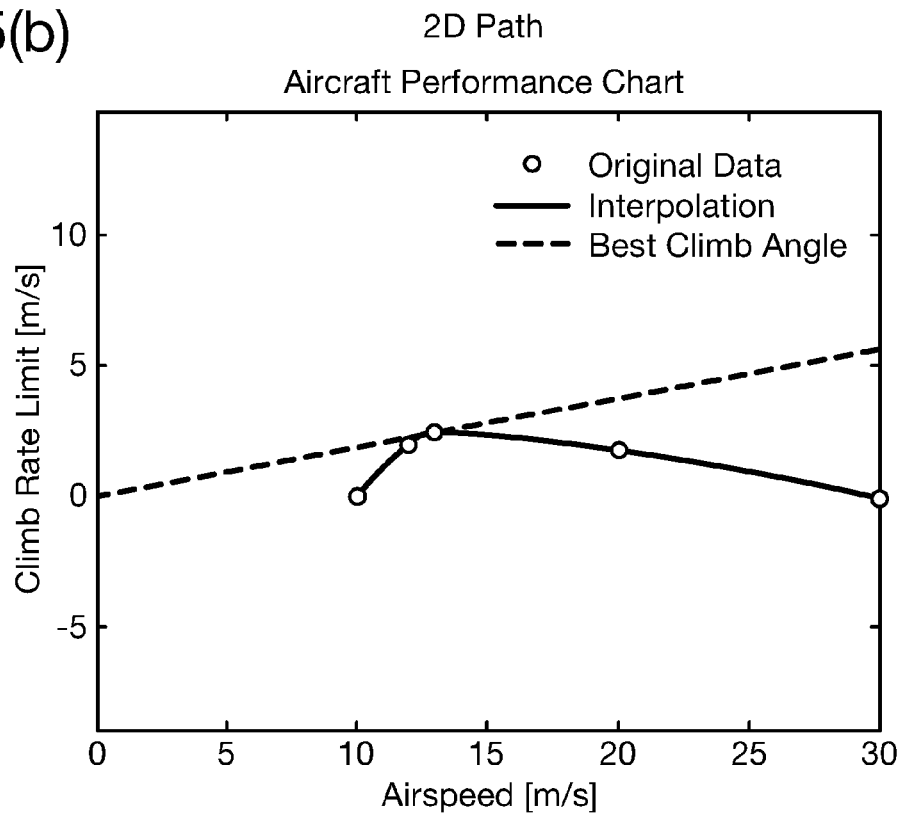
Figure 5C:
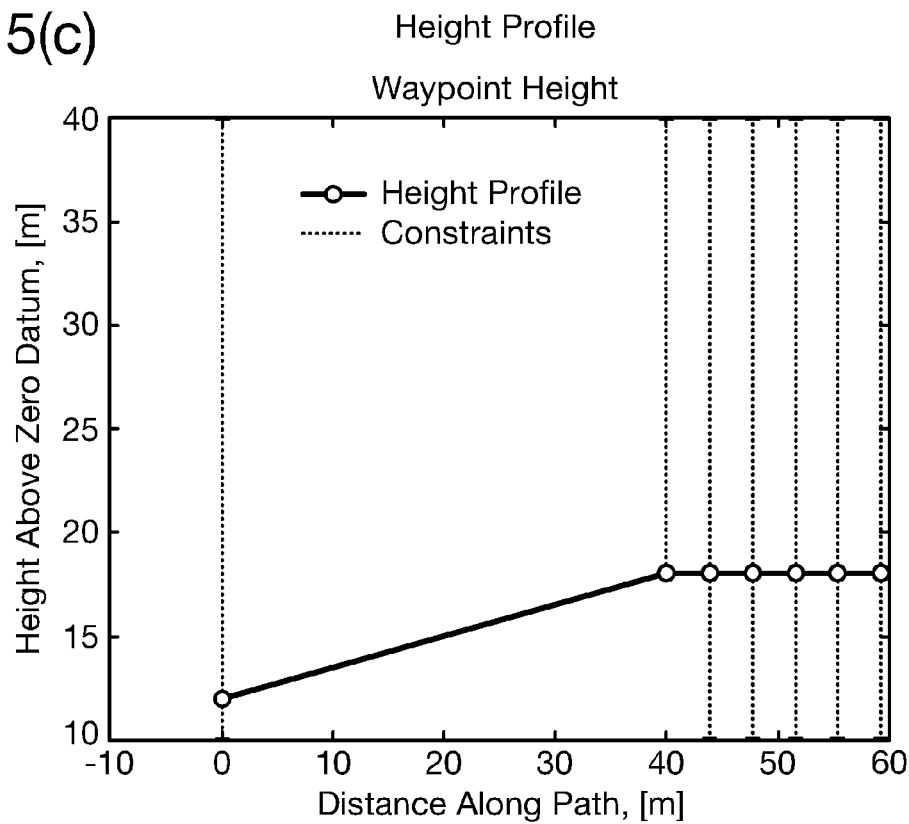
Figure 5D:
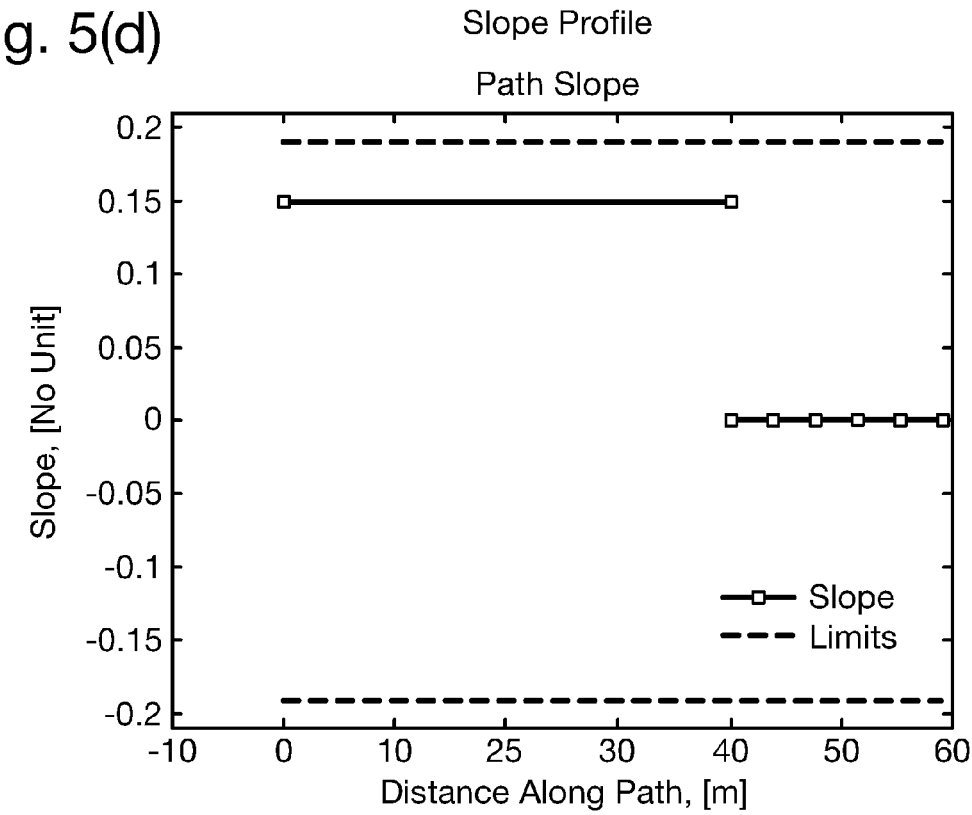

FIG. 5(a) shows the climb performance diagram of the aircraft under consideration. The 2D waypoint sequence, shown in FIG. 5(b), consists of a straight segment, followed by a quarter turn of a radius of 11 m. FIG. 5(c) shows the height bounds of each waypoint and the height profile found by solving equations (1) to (9) above. The slope of the height profile is shown in FIG. 5(d). While on the straight segment, the path climbs strongly with near maximum slope, followed by a level turn. Note that the waypoint heights do not decline after the second waypoint, although the height bounds are relaxed.

Figure 5E:
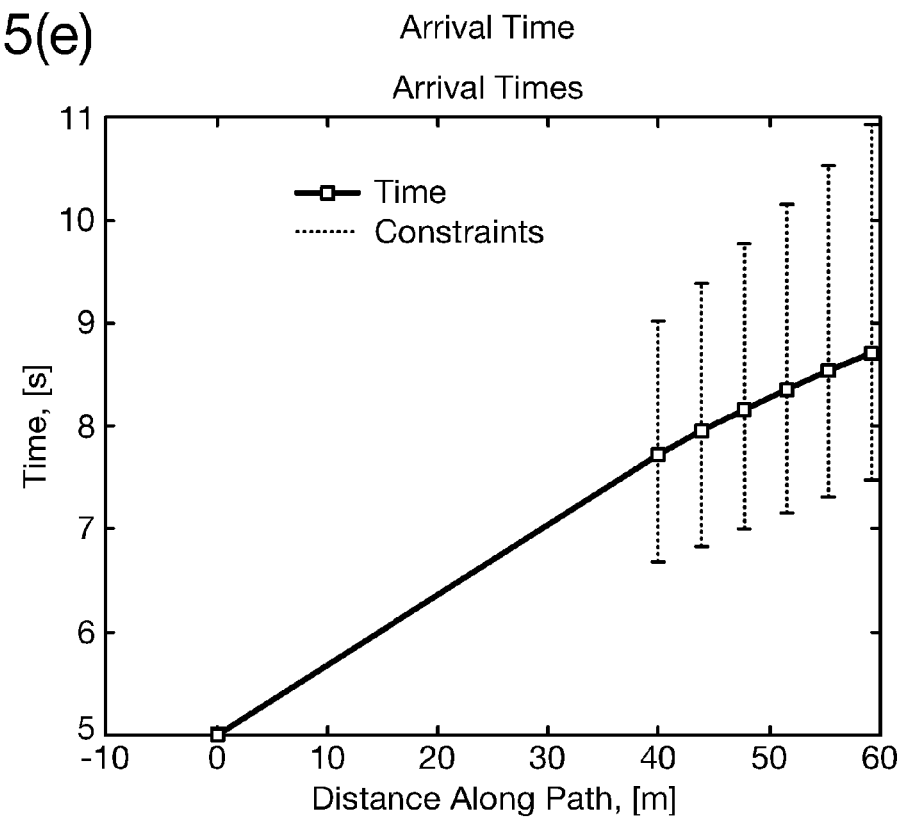

FIG. 5(e) shows the arrival time bounds and the resulting arrival time profile along the path. Although the second optimisation pass, i.e. equations (10) to (24) and equations (27) to (41), minimises the arrival time at the last waypoint, FIG. 5(e) shows an arrival during the first third of the permissible period. This is caused by velocity constraints imposed during the climb and level turn.

Figure 5F:
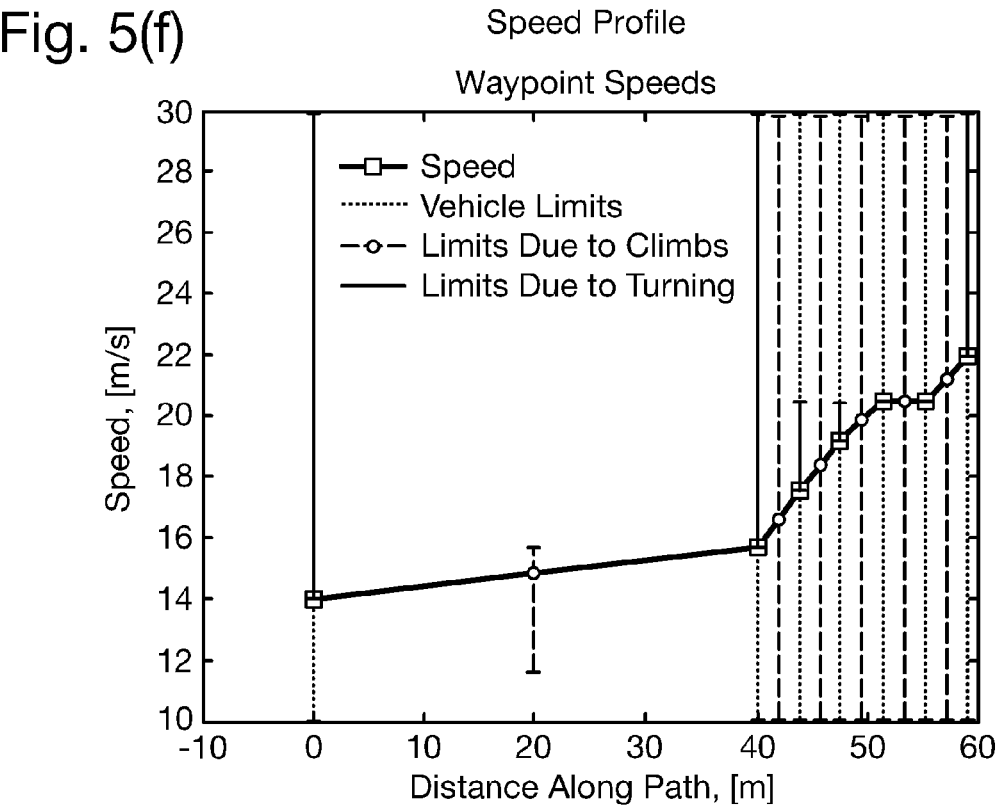
Figure 6A:
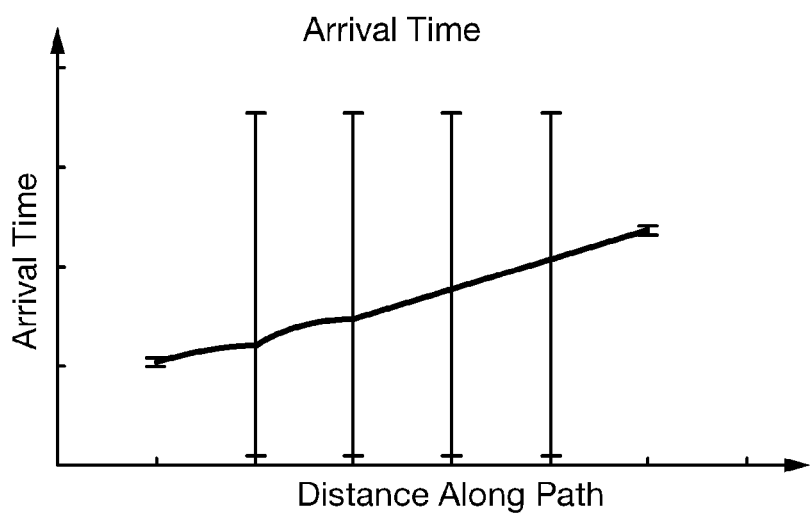
FIGS. 6(a) to (c) illustrate the setting of upper and lower bounds for arrival time, speed and height profiles respectively in relation to path planning for airborne vehicles.
Figure 6B:
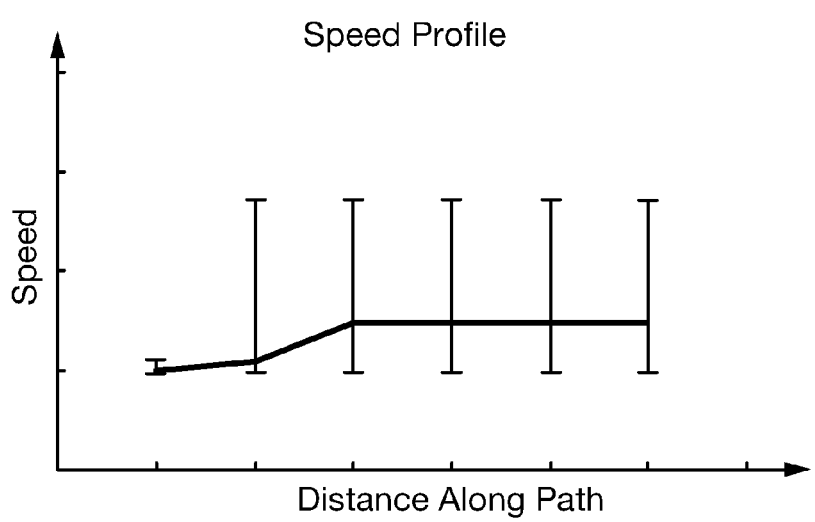
Figure 6C:
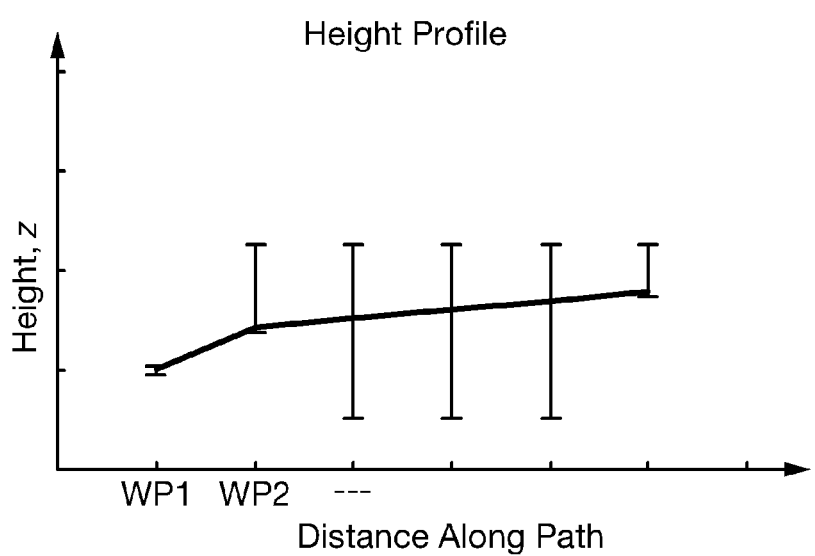

FIG. 5(f) shows the speed profile and its constraints. FIG. 5(f) shows a strong speed limitation due to the initial climb.

In order to minimise the arrival time at the last waypoint, the speed profile accelerates along the first segment up to the highest speed that still permits sufficient climb rate to master the slope. On the circular part of the path, the speed profile is constrained due to the path's curvature and the aircraft's load limit. Hence the speed profile accelerates at maximum rate, until the permissible top speed is reached. On the last segment, which is straight, the speed profile accelerates even further.

Thus, the system and method described above provides an approach for path planning in which speed and height profiles are determined for a given 2D waypoint sequence, such that the waypoint arrival time is bounded, the aircraft's acceleration limit is taken into account, the aircraft's non-linear climb performance is taken into account, the aircraft's turn performance is taken into account, and the non-linear problem of finding speed and height profiles is decomposed into two sequential sub-problems that can be solved using linear techniques. Each waypoint has upper and lower limits on arrival time, speed and height, and vehicle limitations, including acceleration, maximum and minimum speed, and speed limits due to curvature and climb rate, are taken into account.

What is claimed is:

1. A rapid flight path profiling method for determining a path for an aircraft, comprising the steps of:
   determining, by one or more processing devices in an aircraft navigation module, at least two waypoints between a starting position and a desired terminal position for the aircraft;
   determining, by said one or more processing devices in said aircraft navigation module, a path for the aircraft by:
   (i) performing, by said one or more processing devices in said aircraft navigation module, a linear approximation of the heights of said at least two waypoints such that the average height change between waypoints is minimised, and constrained by a maximum climb angle of said aircraft;
   (ii) performing, by said one or more processing devices in said aircraft navigation module, a linear approximation of arrival times for each of said two waypoints and aircraft speeds between said at least two waypoints, constrained by permissible velocity of said aircraft on a slope between said at least two waypoints; and
   returning said path for said aircraft;
   using said path for said aircraft, guiding said aircraft;
   whereby said aircraft travels along said determined path from said starting position to said desired terminal position following speed and height profiles of said path;
   wherein determination of said path between each set of two waypoints is broken into two linear problems whereby said rapid flight path is determined, such that said resulting path is feasible, wherein said aircraft is dynamically capable of altitude and velocity of said flight path.

2. The method according to claim 1, wherein the height of each of said at least two waypoints is bounded by a predetermined maximum and/or minimum value.

3. The method according to claim 1, wherein an absolute value of the slope of said path is bounded by a predetermined maximum value.

4. The method according to claim 1, wherein the slope of the or each path segment between adjacent waypoints is bounded by a predetermined maximum value.

5. The method according to claim 1, wherein aircraft speed is bounded by a predetermined maximum and/or minimum value.

6. The method according to claim 1, wherein the aircraft speed at each waypoint is bounded by a predetermined maximum value.

7. The method according to claim 1, wherein the aircraft speed at each waypoint is bounded by permissible aircraft speed or speed range for an immediately preceding or succeeding path segment.

8. The method according to claim 1, wherein the average aircraft speed on the or each path segment between two adjacent waypoints is calculated using the aircraft speeds at the first and/or final waypoints on the path.

9. The method according to claim 1, wherein the linear approximation of the heights of said at least two waypoints is implemented using:

$$\min_{z,dz,dz_{abs}} f = \frac{1}{n-1}\sum_{i}^{n-1} dz_{abs_i}$$

subject to:

$z_0 = z_1$ $\forall i \in [1 \ldots n]: z_i \leq z_{max_i}$ $\forall i \in [1 \ldots n]: z_i \geq z_{min_i}$ $\forall i \in [2 \ldots n]: dz_{i-1} = z_i - z_{i-1}$ $\forall i \in [2 \ldots n]: dz_{i-1}/d_{i-1} \leq \gamma_{i-1}$ $\forall i \in [2 \ldots n]: \frac{dz_{i-1}}{d_{i-1}} \geq -\gamma_{i-1}$ $\forall i \in [2 \ldots n]: dz_{i-1} \leq dz_{abs_i}$ $\forall i \in [2 \ldots n]: dz_{i-1} \geq -dz_{abs_i}$ where n is the number of waypoints on the path, $z_{min_i}$ and $z_{max_i}$ denote minimum and maximum height values respectively, i denotes each path segment between adjacent waypoints, $dz_i$ is the height difference along the $i^{th}$ path segment, $d_i$ denotes the length of the $i^{th}$ path segment, $dz_{abs_i}$ is an absolute value of the height difference on the $i^{th}$ path segment, and $\gamma$ denotes an absolute slope limit of the path.

10. The method according to claim 1, wherein the linear approximation of arrival times for each of said at least two waypoints and aircraft speeds between said at least two waypoints is implemented by a cost function, subject to:

$v_1 = v_0$ $t_1 = t_0$ $\forall i \in [1 \ldots n]: t_i \leq t_{max_i}$ $\forall i \in [1 \ldots n]: t_i \geq t_{min_i}$ $\forall i \in [1 \ldots n]: v_i \leq v_{max}$ $\forall i \in [1 \ldots n]: v_i \geq v_{min}$ $\forall i \in [1 \ldots n]: v_i \leq v_{lim_i}$ $\forall i \in [2 \ldots n]: v_{i-1} \geq \hat{v}_{min_i}$ $\forall i \in [2 \ldots n]: v_i \geq \hat{v}_{min_i}$ $\forall i \in [2 \ldots n]: v_{i-1} \leq \hat{v}_{max_i}$ $\forall i \in [2 \ldots n]: v_i \leq \hat{v}_{max_i}$ $\forall i \in [2 \ldots n]: \bar{v}_{i-1} = \frac{1}{2}(v_i + v_{i-1})$ $\forall i \in [2 \ldots n]: \bar{v}_{inv_i} d_{i,i-1} \leq t_i - t_{i-1}$ $\forall i \in [1 \ldots n] \forall k \in [1 \ldots n_a]: \bar{v}_i \geq m_k \bar{v}_{inv_i} + c_k$ $\forall i \in [2 \ldots n]: v_i \leq v_{i-1} + a_{max}(t_i - t_{i-1})$ $\forall i \in [2 \ldots n]: v_i \geq v_{i-1} + a_{min}(t_i - t_{i-1})$ where $t_{max_i}$ and $t_{min_i}$ denote the permissible arrival time band at the $i^{th}$ waypoint, $v_{max}$ and $v_{min}$ denote the maximum and minimum speed of the vehicle;

the maximum and minimum speeds on the $i^{th}$ segment due to its slope and height are denoted by $\hat{v}_{max_i}$ and $\hat{v}_{min_i}$;

$v_{lim_i}$ denotes the velocity limit at the $i^{th}$ waypoint, due to the path's curvature at that waypoint;

the variable $v_i$ models the vehicle's speed at the $i^{th}$ waypoint;

the variable $\bar{v}_i$ models the vehicles average speed on the $i^{th}$ segment;

the constants $m_k$ and $c_k$ denote the slope and the y-axis intercept of the $k^{th}$ linear approximation of the relationship between $\bar{v}_i$ and $\bar{v}_{inv_i}$;

the vehicle's acceleration limit and deceleration limit are denoted by $a_{max}$ and $a_{min}$ respectively.

11. The method according to claim 10, wherein said cost function is:

$$\min_{v,\bar{v},\bar{v}_{inv},t} f = t_n.$$

12. The method according to claim 1, wherein the linear approximation of the heights of said at least two waypoints is implemented using a cost function, subject to:

$v_1 = v_0$ $t_1 = t_0$ $\forall i \in [1 \ldots n]: v_{air_i} = v_{gnd_i} c_i - v_{w_i}$ $\forall i \in [1 \ldots n]: t_i \leq t_{max_i}$ $\forall i \in [1 \ldots n]: t_i \geq t_{min_i}$ $\forall i \in [1 \ldots n]: v_{air_i} \leq v_{max}$ $\forall i \in [1 \ldots n]: v_{air_i} \geq v_{min}$ $\forall i \in [1 \ldots n]: v_{air_i} \leq v_{lim_i}$ $\forall i \in [2 \ldots n]: v_{air_{i-1}} \geq \hat{v}_{min_i}$ $\forall i \in [2 \ldots n]: v_{air_i} \geq \hat{v}_{min_i}$ $\forall i \in [2 \ldots n]: v_{air_{i-1}} \leq \hat{v}_{max_i}$ $\forall i \in [2 \ldots n]: v_{air_i} \leq \hat{v}_{max_i}$ $\forall i \in [2 \ldots n]: \bar{v}_{gnd_{i-1}} = \frac{1}{2}(v_{gnd_i} + v_{gnd_{i-1}})$ $\forall i \in [2 \ldots n]: \bar{v}_{inv_{i-1}} d_{i,i-1} \leq t_i - t_{i-1}$ $\forall i \in [1 \ldots n] \forall k \in [1 \ldots n_a]: \bar{v}_{gnd_i} \geq m_k \bar{v}_{inv_i} + c_k$ $$\forall i \in [2 \ldots n]: v_i \leq v_{air_{i-1}} + a_{max}(t_i - t_{i-1})$$

$$\forall i \in [2 \ldots n]: v_i \geq v_{air_{i-1}} + a_{min}(t_i - t_{i-1})$$

where $t_{max_i}$ and $T_{min_i}$ denote the permissible arrival time band at the $i^{th}$ waypoint, $v_{max}$ and $v_{min}$ denote the maximum and minimum speed of the vehicle;

the maximum and minimum speeds on the $i^{th}$ segment due to its slope and height are denoted by $\hat{v}_{max_i}$ and $\hat{v}_{min_i}$; $v_{lim_i}$ denotes the velocity limit at the $i^{th}$ waypoint, due to the path's curvature at that waypoint;

the variable $v_i$ models the vehicle's speed at the $i^{th}$ waypoint;

the variable $\bar{v}_i$ models the vehicles average speed on the $i^{th}$ segment;

the constants $m_k$ and $c_k$ denote the slope and the y-axis intercept of the $k^{th}$ linear approximation of the relationship between $\bar{v}_i$ and $\bar{v}_{inv_i}$;

the vehicle's acceleration limit and deceleration limit are denoted by $a_{max}$ and $a_{min}$ respectively.

13. The method according to claim 12, wherein the cost function is:

$$\min_{v_{air}, v_{gnd}, \bar{v}_{gnd}, \bar{v}_{inv}, t} f = t_n.$$

14. Apparatus for rapidly determining a flight path for an aircraft, the apparatus comprising one or more processing devices in an aircraft navigation module arranged to determine a path for the aircraft between a starting position and a desired terminal position, wherein at least two waypoints are defined therebetween, by:
(i) performing, by said one or more processing devices in said aircraft navigation module, a linear approximation of the heights of said at least two waypoints such that the average height change between waypoints is minimised, and constrained by a maximum climb angle of said aircraft;
(ii) performing, by said one or more processing devices in said aircraft navigation module, a linear approximation of arrival times for each of said at least two waypoints and aircraft speeds between said at least two waypoints, constrained by permissible velocity of said aircraft on a slope between said at least two waypoints; and
returning said path for said aircraft;
using said path for said aircraft, guiding said aircraft;
whereby said aircraft travels along said determined path from said starting position to said desired terminal position following speed and height profiles of said path;
wherein determination of said path between each set of two waypoints is broken into two linear problems whereby said rapid flight path is determined, such that said resulting path is feasible, wherein said aircraft is dynamically capable of altitude and velocity of said flight path.

15. A computer-readable non-transitory storage medium storing instructions that, when executed by a computing device, cause the computing device to perform operations in accordance with the method of determining a path for an aircraft, comprising the steps of:
determining, by one or more processing devices in an aircraft navigation module, at least two waypoints between a starting position and a desired terminal position for the aircraft;
determining, by said one or more processing devices in said aircraft navigation module, a path for the aircraft by:
(i) performing, by said one or more processing devices in said aircraft navigation module, a linear approximation of the heights of said at least two waypoints such that the average height change between waypoints is minimised, and constrained by a maximum climb angle of said aircraft;
(ii) performing, by said one or more processing devices in said aircraft navigation module, a linear approximation of arrival times for each of said two waypoints and aircraft speeds between said at least two waypoints, constrained by permissible velocity of said aircraft on a slope between said at least two waypoints; and
returning said path for said aircraft;
using said path for said aircraft, guiding said aircraft;
whereby said aircraft travels along said determined path from said starting position to said desired terminal position following speed and height profiles of said path;
wherein determination of said path between each set of two waypoints is broken into two linear problems whereby said rapid flight path is determined, such that said resulting path is feasible, wherein said aircraft is dynamically capable of altitude and velocity of said flight path.

* * * * *